May 5, 1942.　　　　W. L. BROWN　　　　2,281,669
GAS METER
Filed Aug. 25, 1939　　　　4 Sheets-Sheet 3
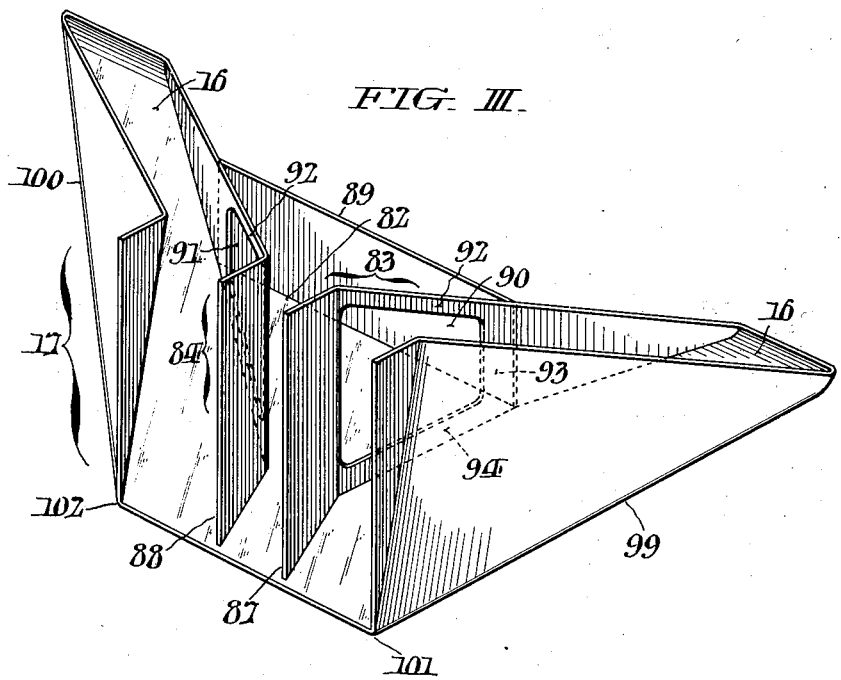
FIG. III.
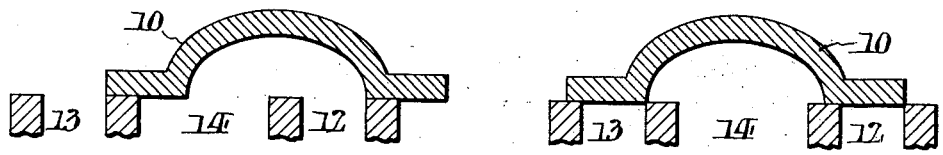
FIG. VI.　　　　FIG. VII.
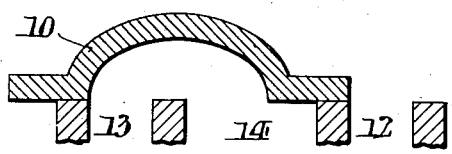　　　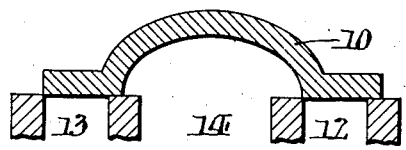
FIG. VIII.　　　　FIG. IX.
INVENTOR.
William Laird Brown

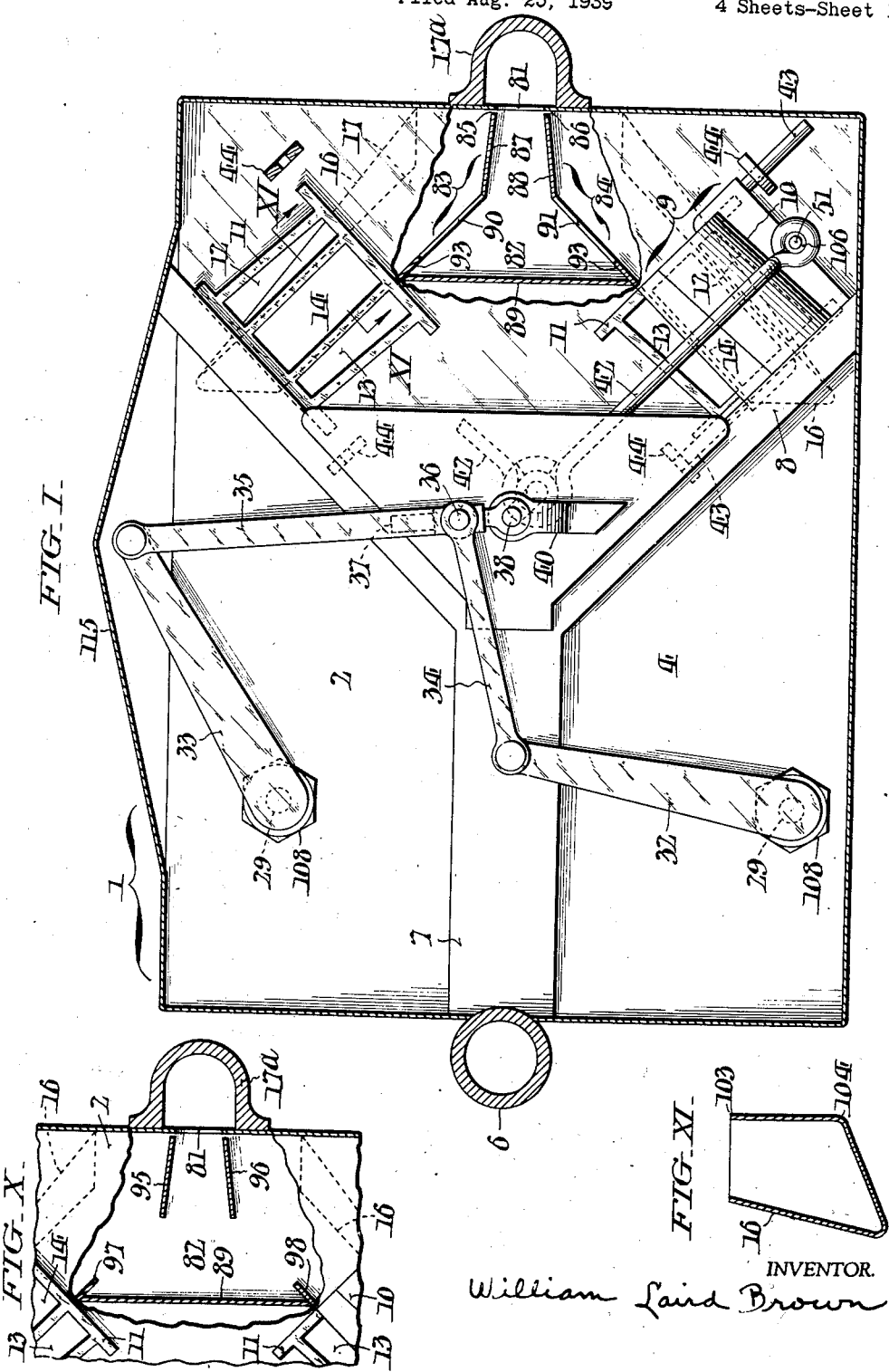

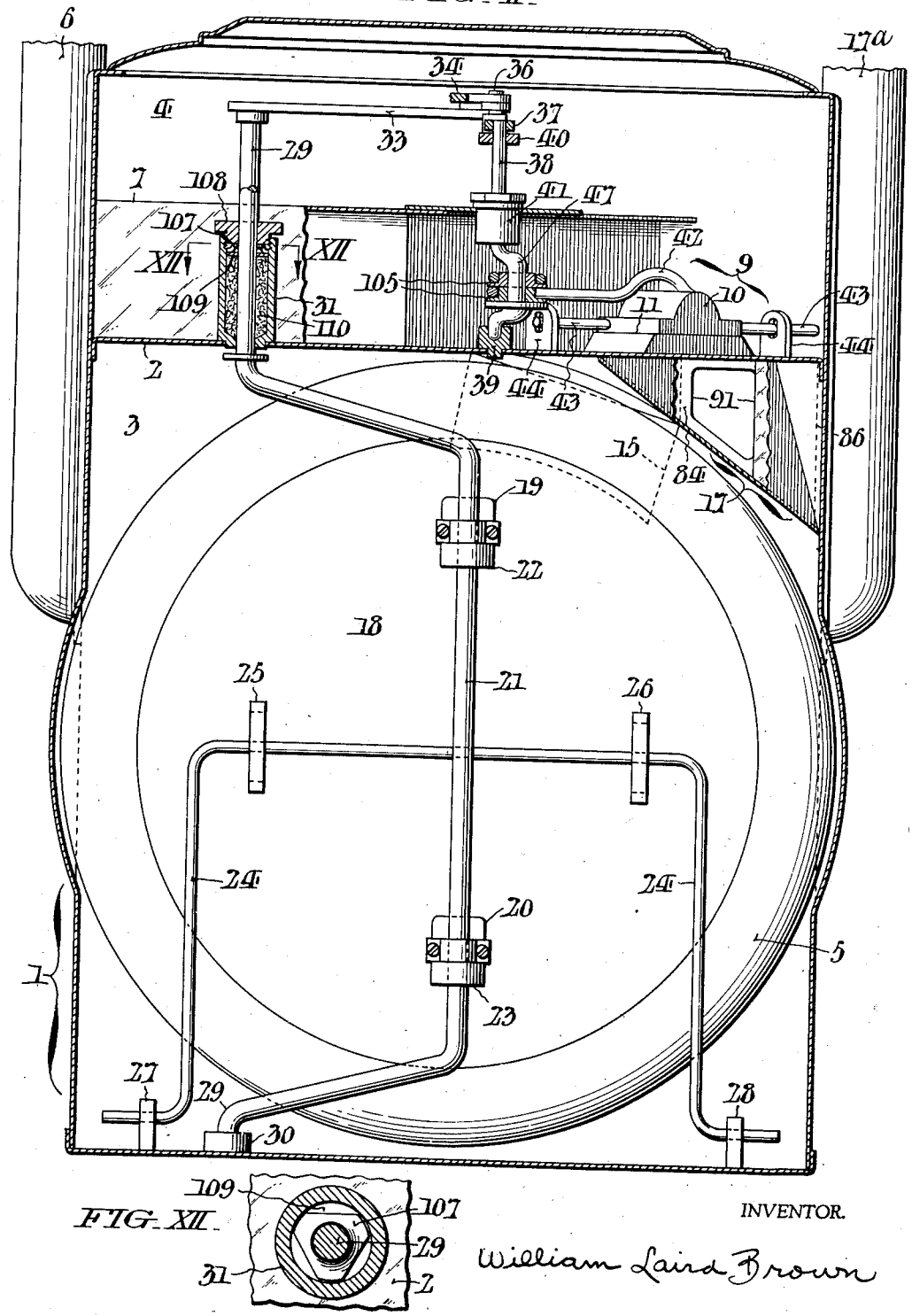

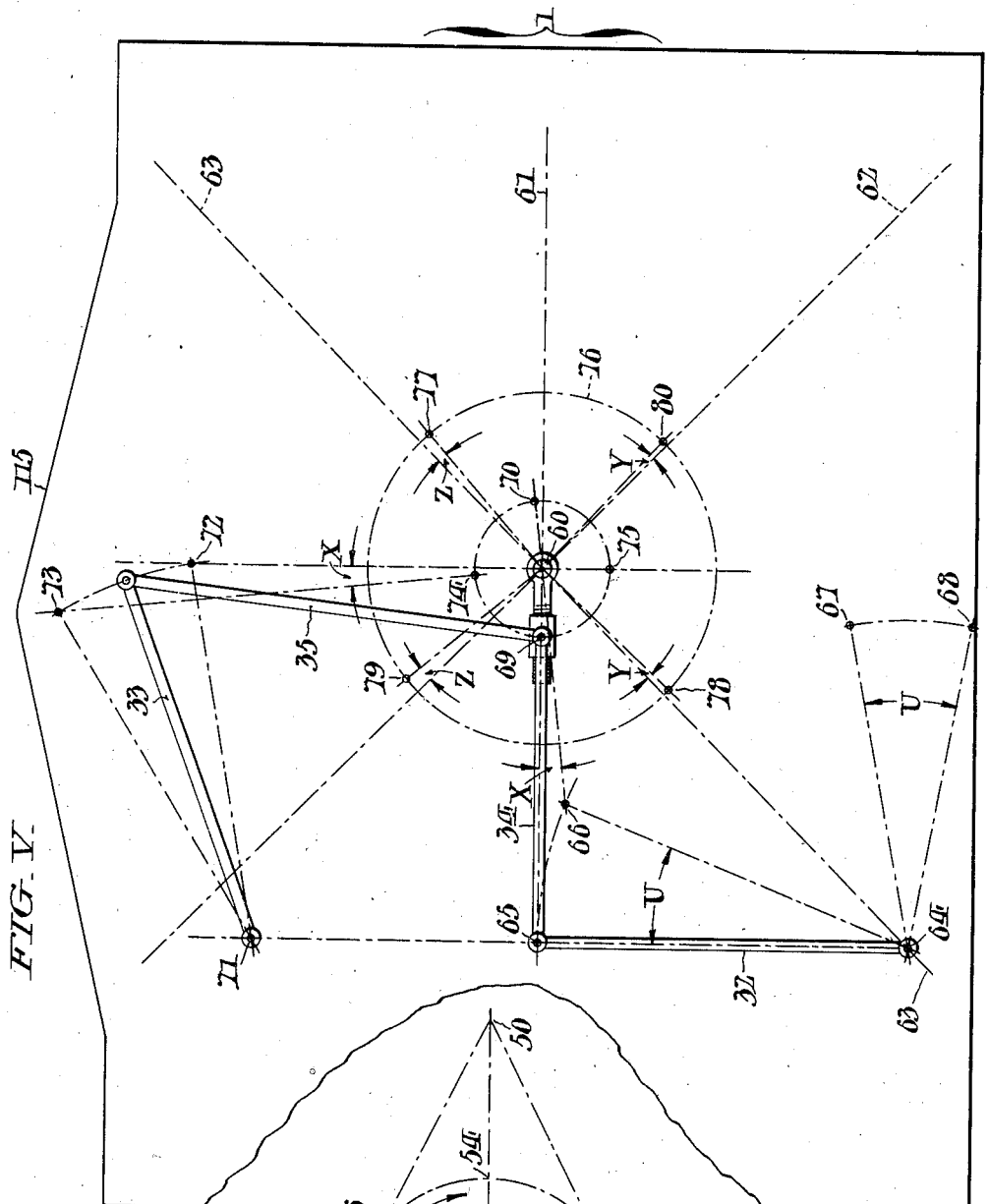

Patented May 5, 1942

2,281,669

UNITED STATES PATENT OFFICE 2,281,669

GAS METER

William Laird Brown, Lansdowne, Pa.

Application August 25, 1939, Serial No. 291,843

13 Claims. (Cl. 73—268)

This invention relates to gas meters; and it has reference more particularly to meters of the positive displacement type designed to measure the flow of gases volumetrically. In meters of the kind referred to, the gas traverses a pair of opposing bellows, which, through flags and flag rods, actuate a linkage mechanism whereby a tangent arm is rotated, said tangent arm being secured to a valve crank shaft from which reciprocating slide valves are actuated to control admission and exhaust of the gas to and from the bellows.

My invention has for one of its aims to increase capacity in such meters without increasing speed of the moving parts; and at the same time to minimize irregularities of meter movement to insure delivery of the gas with smaller fluctuations in outlet pressure than obtain in ordinary meters. These objects I realize in practice, as hereinafter more fully disclosed, through improved proportioning and arrangement of the linkage mechanism by which motion is transmitted from the bellows to the valves.

Other objects and attendant advantages will appear from the following detailed description of the attached drawings, wherein Fig. I is a staggered horizontal section of a gas meter conveniently embodying the present improvements, viewed from the top, with certain parts removed or broken out to expose important parts which would otherwise be hidden.

Fig. II, a staggered longitudinal section of the meter viewed from the front, with certain parts broken out.

Fig. III, a perspective view of the fork channel, showing the theft prevention baffles.

Fig. IV, a diagram in plan showing the relation of the valve crank shaft, the crank arm, and the slide valve wrist.

Fig. V, a diagram in plan showing, in conjunction with Fig. IV, the movement of my improved meter as exemplified in Fig. I.

Fig. VI, a diagrammatic longitudinal section of a valve cover at the position on its seat furthest from the valve crank shaft.

Fig. VII shows the valve cover about to admit gas to the case port.

Fig. VIII shows the valve cover at the position closest to the valve crank shaft.

Fig. IX shows the valve cover about to admit gas to the diaphragm port.

Fig. X shows an alternative form of my improved theft prevention baffle means.

Fig. XI is a transverse sectional view of one fork channel branch, taken as indicated by the arrows XI—XI in Fig. I.

Fig. XII is a transverse sectional view of one of the stuffing boxes of my improved meter, taken as shown by the arrows XII—XII in Fig. II.

The gas meter herein delineated for convenience of exemplifying my invention is generally of well known construction, having a generally rectangular casing 1, with a horizontal partition (valve table) 2 setting apart a comparatively high lower compartment 3 and a shallower upper compartment or "gallery" 4. The lower compartment 3 is in turn sub-divided by a central longitudinal partition into two chambers for the two bellows 5 of the meter. Leading from the gas inlet 6 is a channel 7, in this instance within the gallery 4, by which the gas is conducted to a box 8 containing the valves 9 whereby the admission of gas to and from both sides of the bellows 5 is controlled. Gas may be conducted from the inlet 6 to the valves 9 otherwise than herein shown by way of example, without in any way affecting the advantages of my invention, as will be readily understood from further description. Each of the valves 9 comprises a cover 10 which moves back and forth over a seat 11 to connect the outer ports 12 and 13 alternately with a center port 14. The diaphragm ports 13 communicate respectively with the inside of the bellows 5 through channels as instanced by dotted lines at 15 in Fig. II; while the case ports 12 communicate respectively with the outside of the bellows. The center ports 14 lead into branches 16 of a fork channel 17 (Fig. III) by which gas is conducted to the outlet 17a of the meter.

As ordinarily, each bellows 5 carries a disc 18, whereon are mounted brackets 19, 20, in which the offset portion of the flag rod turns freely. Such an offset flag rod, combining the functions of the straight vertical flag rod and of the attached crank known as the "flag," is well known. Collars 22, 23 fast to the flag rod, position the disc as to its horizontal travel. A disc guide wire 24, sliding in guides 25, 26 which are fast to the disc 18, insures that the various positions of the disc during its travel shall be substantially parallel to each other, said guide wire being journalled in bearings 27, 28 fixed to the bottom of the meter casing 1. The flag rods 29 are journalled in bearings 30 fixed to the bottom of casing 1, thence extending upwards to the offset portion 21, which is operatively connected with the disc 18 as explained; and then, returning to the axis passing through bearing 30, extend through the gas tight flag rod stuffing boxes 31 into the gallery 4. Affixed to the upper ends of the flag rods 29 are flag arms 32, 33, which, through links 34, 35 are connected to the tangent post 36 on the tangent arm 37. The bulge 115 in the rear meter casing wall provides room for the movement of the rear flag arm 33. The tangent post 36 is adjustable along the threaded portion of the tangent arm 37, and is fixable in adjusted position by jam nuts as usual. The tangent arm 37 is adjustably fixed to the valve crank shaft 38, which, at its lower end, is journalled in a bearing 39 on table 2, and, near its upper end, in a bearing member 40, commonly known as the "kingpost." The valve crank shaft 38 also has journal support in a gas tight stuffing box 41. By means of crank arms 42 actuated from the valve crank shaft 38, the covers 10 of the valves 9 are reciprocated on the valve seats 11, while confined to straight line motion by attached valve guide wires 43, which engage guides 44 upstanding on table 2. The usual provision for driving the index by a worm on valve crank shaft 38 engaging a gear wheel on a horizontal axle, forms no part of this invention, and is not shown.

The refinements which I have made for attainment of the important practical advantages hereinbefore pointed out are as follows:

It is particularly to be noted, in the discussion of valve cover motion in relation to diaphragm disc travel that follows, that, in the ordinary meter, a line drawn through the extreme positions of either flag arm bearing axis passes through the vertical axis of the valve crank shaft, so that the positions of the tangent post (corresponding to 36 of Fig. I) are 180 degrees apart for the extreme positions of the front flag arm, and 180 degrees apart for the extreme positions of the rear flag arm. The tangent arm (corresponding to 37, Fig. I) moves in fixed angular relation to the valve crank (corresponding to 47, Fig. II) during meter operation, so that the positions of the valve crank are likewise 180 degrees apart for extreme positions of each flag arm, and consequently for extreme positions of each diaphragm disc.

Differing from the foregoing, in my invention the valve crank positions corresponding to extreme disc positions are not 180 degrees apart, and lines drawn from the extreme positions of either flag arm bearing axis to the valve crank shaft axis form an acute angle with each other, instead of coinciding, as more fully explained later herein.

Fig. IV diagrammatically represents a plan of the movement of the valve crank in a meter of the type described, wherein the point 45 is the position of the vertical valve crank shaft axis, the circle 46 represents the path of the axis of the valve crank bearing, rotating clockwise as marked by the arrow, the line 48 is one axis of valve cover motion, while line 49 is drawn through point 45 at right angles to line 48. Point 50 represents the valve wrist (corresponding to 51 of Fig. I) at a position later defined, and lines 50—52 and 50—53 are respectively two positions of the crank arm (corresponding to 42 of Fig. I). Lines 50—52, 50—45, and 50—53 are equal in length, an arc drawn from point 50 as a center passing through the points 52, 45, and 53 as shown. It should be understood that the diameter of the circle 46, in proportion to the length of the crank arm 50—52, is exaggerated as compared to the proportions actually employed in practice, for the purpose of showing more clearly the irregularities of motion now to be discussed.

Referring to Fig. I, full port opening will be secured when the valve cover edge nearest the valve crank shaft 38 is directly over the inner edge of diaphragm port 13 at one end of the stroke, and the valve cover edge furthest from the valve crank shaft is directly over the inner edge of case port 12 at the other end of the stroke, case and diaphragm ports being equal in width as usual. Referring again to Fig. IV, and disregarding valve cover lap and lost motion for the moment, this effect of full port opening will be secured when, with the valve cover in mid-position and sealing both case and diaphragm ports, and with the valve wrist at point 50, the length of the crank arm is equal to the distance 45—50, so that the extreme travel of the valve cover will be the same in both directions from the position shown, the total travel being equal to the diameter of the circle 46, and the valve crank bearing axis at extreme positions of the valve cover being at 54 and 55 respectively. As specified above, Fig. IV has been laid out to these conditions.

With this setting of the valve cover, admission on the diaphragm port (corresponding to 13 of Fig. I) would take place when the valve crank bearing axis reaches point 52, the valve cover with the wrist at point 50 being at seal position (still disregarding lost motion and valve cover lap). Admission on the case port (corresponding to 12 of Fig. I) would take place at 53. Thus the admission points for the two outer ports would be distant from each other, not by 180 degrees, to agree with the respective ends of the disc stroke, but by an angle differing from 180 degrees by twice the angle V.

Actually admission will take place on the diaphragm port when the valve crank bearing axis has moved beyond 52 by a distance 52—56, made up of a movement 52—57 corresponding to lost motion in the crank shaft and valve wrist bearings, and a distance 57—56 necessary to move the valve cover by the amount of the lap. Likewise admission on the case port will actually take place when the valve crank bearing axis reaches 58. Thus the actual positions of the valve crank at the two points of admission are at an angle differing from 180 degrees by angle X', which is equal to angle Y' plus angle Z'. In an actual meter, with the ratio of crank arm length to crank throw considerably greater than in Fig. IV, the movements of the valve cover corresponding to the arcs 52—56 and 53—58 respectively will be practically equal, so that the angle corresponding to the angle X' will be practically equal to twice the angle corresponding to the angle V.

Thus the angles between the crank arm and the axis of valve cover motion at admission positions, in an actual meter, at the two positions of the valve crank bearing axis corresponding to 56 and 58 of Fig. IV respectively, will differ slightly from each other, but will both be substantially equal to an angle corresponding to angle 52—50—55. This angle 52—50—55 is equal to twice the angle V, for a line bisecting angle 52—50—55 will be at right angles to the radius 45—52, and so one half of angle 52—50—55 will be equal to angle V, their sides being respectively at right angles. Hence, in an actual meter, the angles between a crank arm and the corresponding axis of valve cover motion, at admission positions, will both be substantially equal to an angle corresponding to angle X' of Fig. IV, angle X' being substantially twice angle V as explained.

Now it is desirable, for meter accuracy at various rates of flow, for steadiness of outlet pressure, and for smoothness of meter operation, to arrange valve admission at or close to the instant when the diaphragm disc 18 is at the end of its stroke. As shown previously, the positions of the valve crank corresponding to extreme positions of one diaphragm disc, in the ordinary meter, are 180 degrees apart, and points of admission to the co-acting valve should likewise be at valve crank positions 180 degrees apart. However, it is evident from the preceding paragraph, that for full port opening with the ordinary meter, the angle between the valve crank positions corresponding to the points of admission differs from 180 degrees by an angle corresponding to X', so that, if admission on the diaphragm port takes place when the disc is at the end of its stroke, the case port will be open by a considerable amount, corresponding to the angle X', when the diaphragm disc has reached the outward end of its stroke, after 180 degrees of valve crank travel, instead of being on the point of opening. This will tend to produce jerkiness in meter movement, as more fully explained presently.

In the ordinary meter, this discrepancy between valve cover motion and diaphragm disc travel may be compensated for by shifting the valve wrist relative to the valve cover, as from the point 50 towards the point 45 (or, which amounts to practically the same thing, by lengthening the crank arm 50—52), until the points 56 and 58, moving towards the left on the diagram of Fig. IV, arrive at a diameter of the crank circle 46, as on line 59. This brings the points of admission into proper relation with diaphragm disc movement, the positions on the crank circle corresponding to points of admission being 180 degrees apart; but also causes a departure from full port opening, in that the valve cover fails to open the case port fully by an amount corresponding to the distance from the point 56 to the diameter 59, while the valve cover at its other extreme position will overrun the edge of the diaphragm port by a wipeover of the same amount.

This compensated valve setting in the ordinary meter reduces meter capacity by reducing the average opening of the case port in admitting gas, and of the diaphragm port in exhausting gas. Further, fluctuations in outlet pressure during meter operation arise in part from the fact that the sum of the port openings in admitting gas, and also in exhausting gas, varies from point to point of the valve crank travel, so that the loss of pressure through the valves, and the related outlet pressure, vary accordingly. With the compensated valve setting in the ordinary meter, effected by adjustment of valve wrist or crank arm length as already explained, the opening of the diaphragm port in admitting gas will be constant at full opening during meter operation for an appreciable interval, from the time that the valve cover edge crosses the inner port edge in outward travel, to the time that the cover edge reaches the same port edge in inward travel; while at the same time the opening of the port admitting gas in the other valve will be changing at or near its maximum rate, the cover of that other valve being close to mid-position, where its travel is swiftest. Like considerations apply to the case port in exhausting gas. These conditions operate to increase the divergence from average port opening, over a revolution of the valve crank shaft, and thus increase fluctuations in outlet pressure.

On the other hand, if the valve in the ordinary meter is set to bring full port opening on both ports, or to give a wipeover smaller than arises from the compensated setting already described, then each diaphragm disc, near one limit of its travel, is not at the end of its stroke when gas is admitted through the co-acting port, and is dragged for some distance against gas pressure by the action of the other disc operating on the common tangent post, with resultant jerkiness of meter action and increased fluctuations in outlet pressure; or this effect, by a different setting, may apply to both ends of the disc stroke in some measure.

In my invention, the lengths and positions of the flag arms 32, 33 and of the flag arm links 34, 35 are so arranged that the diaphragm discs 18 are at the respective ends of their strokes when the valve covers 10, set for full port opening, are at the corresponding points of admission, thus securing greater capacity for a given size of valve, and reduced fluctuations in outlet pressure. This may be accomplished under many different arrangements within the scope of my invention, but for example, and for convenient comparison with the ordinary meter construction, I have chosen the proportions and positions shown diagrammatically in Fig. V, and in an actual meter in Fig. I. In Fig. V, the following positions coincide for both the ordinary meter and for the exemplification of my improved construction shown:

Position of vertical valve crank shaft axis—point 60.

Longitudinal medial axis of valve table 2—line 61.

Axis of motion of front valve cover—line 62, at 45 degrees to line 61.

Axis of motion of rear valve cover—line 63, at 45 degrees to line 61, and therefore at right angles to line 62.

Position of vertical axis of front flag rod—point 64 on line 63.

The other elements of Fig. V are as follows:

Lines drawn from the extreme positions of the front flag arm bearing axis 65, 66 to the valve crank shaft axis 60 form an acute angle X, and the parts are so proportioned and positioned that this angle X is equal to the angle, derived from the dimensions of the actual meter, corresponding to X' of Fig. IV.

Likewise, lines drawn from the extreme positions of the rear flag arm bearing axis 72, 73 to point 60 form the same angle X, line 60—72 being at right angles to line 61.

The angle U between extreme flag arm positions is of course equal to the angle 67—64—68, 67 and 68 being respectively the extreme positions of the axis of the offset vertical portion of the flag rod (21 in Fig. II).

69 is the position of the tangent post when the front disc is at its extreme inward position; and 70 is the position of the tangent post, on the line 66—60 extended, when the front disc is at its extreme outward position.

65—69 is the length of the front flag arm link 34.

71 is the position of the rear flag rod axis, 72, 73 respectively the extreme positions of the rear flag arm bearing axis; and 74, 75, respectively the positions of the tangent post when the rear diaphragm disc is at its extreme outward and inward positions, corresponding to 70 and 69 for the front disc. The distance 73—74 is the length of the rear flag arm link 35.

Circle 76 is the path of the valve crank bearing axis, drawn on an exaggerated scale as compared to the tangent post circle drawn through 69, etc., and angles Y and Z equal respectively the angles derived from the dimensions of the actual meter corresponding to Y' and Z' of Fig. IV. Hence 77 and 78 are the positions of the valve crank bearing axis at the admission points on the diaphragm and case ports respectively of the front valve; while 79 and 80 are the like for the rear valve.

By analogy with Fig. IV, angle X equals angle Y plus angle Z, and angle X, equal to an angle corresponding to angle X' of Fig. IV, is substantially equal to the angles between a crank arm and the related axis of valve cover motion when the valve cover is in admission positions.

It remains to show how, with the foregoing conditions, admission takes place when the diaphragm discs are at their extreme positions.

Starting with the front flag arm bearing axis at 65 (Fig. V), with the front disc at its extreme inward position, and the valve crank bearing axis at 77, with the valve cover about to admit gas to the front diaphragm port to move the disc outward, a complete cycle of meter operation is tabulated below, with the events in proper order for clockwise rotation of the tangent arm. "Front" or "Rear" in the first column determines whether the other items in the same line refer to the front or rear flag arm bearing axis, diaphragm disc, and valve cover.

Along with this table, Figs. VI to IX inclusive are to be considered, in which 10 is the valve cover, 12 the case port, 13 the diaphragm port, and 14 the center port. The cover in these figures is drawn with the usual lap. For the sake of simplicity these figures are drawn as if all transverse cover and port edges were parallel as usual, instead of having some edges inclined to others as described as a separate feature of my invention later. Valve positions referring to these figures in the sixth column of the table correspond to the positions of the other elements in the same line.

| Front or rear | Flag arm bearing axis at— | Position of dia. disc | Tangent post axis at— | Valve crank bearing axis at— | Valve cover in position of— |
|---|---|---|---|---|---|
| Front | 65 | Extreme inward. | 69 | 77 | Fig. IX. |
| Rear | 73 | Extreme outward. | 74 | 80 | Fig. VII. |
| Front | | | | On line 62 adjacent to 80. | Fig VI. |
| Front | 66 | Extreme outward. | 70 | 78 | Fig. VII. |
| Rear | | | | On line 63 adjacent to 78. | Fig. VIII. |
| Front | | | | On line 62 adjacent to 79. | Fig. VIII. |
| Rear | 72 | Extreme inward. | 75 | 79 | Fig. IX. |
| Rear | | | | On line 63 adjacent to 77. | Fig. VI. |

Since tangent arm and valve crank are in fixed angular relation during meter operation, they will travel over the same angle for a given meter movement, and the relation between the various positions will be as tabulated below:

| Positions of flag arm bearing axis | Travel of tangent post axis | Travel of valve crank bearing axis | Angular movement of both tangent post axis and valve crank bearing axis |
|---|---|---|---|
| 65, 73 | 69 to 74 | 77 to 80 | 90 degrees minus angle X. |
| 73, 66 | 74 to 70 | 80 to 78 | 90 degrees. |
| 66, 72 | 70 to 75 | 78 to 79 | 90 degrees plus angle X. |
| 72, 65 | 75 to 69 | 79 to 77 | 90 degrees. |

Remembering that angle X equals angle Y plus angle Z, it will be seen that both the foregoing tables agree with Fig. V. Thus at the end of each diaphragm disc movement, the corresponding valve cover will be at the point of admission, about to admit gas to that side of the diaphragm disc which has been under exhaust during the immediately preceding movement; while the valve covers at their extreme positions will be giving full opening on both case and diaphragm ports without any wipeover, as in Figs. VI and VIII, since the admission points on the valve crank circle, 77 and 78, 79 and 80, are laid out to conform to the movement of a valve cover set for full opening. Meter capacity will thus be increased, and outlet pressure fluctuations lessened as previously explained.

Another advantage of eliminating the wipeover employed in the compensated setting of the ordinary meter is that the widths of the cross bars of the valve seat may be reduced, each by the amount of the wipeover, still maintaining the minimum width of seal at extreme positions of the valve cover as is provided in the ordinary meter at cover position furthest from the valve crank shaft, where the minimum seal is the width of the bar minus the wipeover. This reduction in cross bar area will reduce the resistance to meter movement due to stickiness of gas condensation, thus reducing wear and increasing capacity.

Another advantage of my construction is that, for a given angularity between flag arm links and tangent arm, the diaphragm disc stroke, as compared with the ordinary meter, can be measurably increased, with reduced speed for a given delivery of gas, and/or increased meter capacity. If flag arms of the usual proportions were laid out on Fig. V, such that the extreme left hand position of the front flag arm would coincide, or nearly coincide, with line 64—71, and such that a line through the extreme positions of the flag arm bearing axis would pass through point 60, then longer flag arms than 32 or 33 would be required, and the distance between the extreme positions of the flag arm bearing axis would be increased (as compared with distance 65—66) if the same angle U is to be included to correspond with the same disc stroke. This change would increase the effective length of the tangent arm (corresponding to the distance 69—60) and would decrease the length of the flag arm link, by both of these changes increasing the angularity between the two elements named, with attendant disadvantages in respect to smoothness of meter operation and wear of moving parts.

From the foregoing description and accompanying drawings it will be seen that construction under my invention may include some or all of the following divergences from the ordinary meter diagram:

1. A line through extreme positions of flag arm bearing axis does not pass through the valve crank shaft axis.

2. Positions of one or both of the flag rod axes not on extensions of the valve axes.

3. Positions of the flag rod axes not on the same transverse line at right angles to the longitudinal axis of the meter.

In reference to the preceding points 2 and 3, it will be noted, that in the diagram of Fig. V, one flag rod axis 64 coincides with the ordinary position on line 63. The other flag rod axis differed from the usual position in not being on line 62, although it is on the line running through the other flag rod axis at right angles to the longitudinal axis of the meter. However, the position of the flag rod axes may be chosen wherever convenient, on lines 62 and 63 respectively or elsewhere; and the line connecting the flag rod axes may be at right angles to the longitudinal axis of the meter or not: with adherence to the following conditions for both front and rear members:

(a) Angle X subtending the angle U shall be derived from the conditions of the actual meter as angle X' is derived in Fig. IV. One of the lines forming the angle X for the front flag rod in Fig. V was chosen to coincide with the longitudinal meter axis 61, but it is not necessary that either of the lines enclosing angle X shall coincide with line 61, provided that the other conditions of the construction are adhered to.

(b) Angle U, the flag arm sweep, is of course equal to the sweep of the flag (or the mechanically equivalent offset portion of the flag rod). Angle of sweep for the front flag arm need not be the same as the angle of sweep for the back flag arm, if a difference here is desirable for convenience in construction, and differences in the values of the front and rear sweep angles can be provided for by corresponding differences in the lengths of the front and rear flags (64—67 for the front flag in Fig. V) and/or of the diaphragm disc strokes (67—68 for the front disc in Fig. V). Both front and rear flag arm sweeps, however, even if unequal, must still subtend the same angle X.

(c) The lengths and positions of the front and rear flag arms and their links are so related that they will operate on a common tangent post circle.

Returning now to divergences from the ordinary meter:

4. Front and rear flag arms of different lengths, as in Fig. V.

5. Front and rear flag arm links of different lengths, as in Fig. V.

In an actual meter according to my invention, I realize that variations from the theoretical diagram will arise from variations in sizes of parts manufactured with production tolerances, differences in assembly, etc. The same considerations apply to variations from diagram of an actual ordinary meter, and in that case such variations are met, as they may be in my construction, by simple adjustments in assembly and proving.

Turning now to the form of valve shown in Fig. I: fluctuations occur in outlet pressure partly due to the fact that the sum of the port openings varies over a revolution of the tangent arm, as previously mentioned. This disadvantage may be reduced by providing that a given motion of the valve cover, when the cover is moving at or near its maximum rate of speed for a certain rate of gas flow, shall produce a smaller change in port opening area than when the cover is moving more slowly, thus tending to keep the total port opening area at any moment closer to its average. As shown in Fig. I, the outer cross bars of the ports 12 and 13 are set at an angle to the valve axis (line 63 in Fig. V) differing slightly from 90 degrees, while the co-acting outer edges of the cover 10 are at right angles to said axis. The two inner cross bars of the seat 11 are set at right angles to the valve axis, and the co-acting inner edges of the cover are set at an angle to said axis differing slightly from 90 degrees. Thus when the valve cover is in motion near mid-position, and therefore close to its maximum speed for the existing rate of gas flow, the port opening area for the valve in question increases more slowly, in proportion to valve cover travel, than at other points of cover motion, because the co-acting edges of valve cover and seat are inclined to each other.

It will be seen that this effect could be extended, by increasing the inclination of cover and seat edges to each other, until the sum of the port openings would be close to the average at all positions. This would necessitate a considerably longer cover, however, and this has disadvantages as to wear and resistance to motion which make a considerable increase of inclination of port and cover edges impractical for ordinary use, though of value for some special purposes.

In comparison with the construction featured in my co-pending application No. 238,133, filed Nov. 1, 1938, the present construction is characterized by bars with parallel sides, and by cover edges being directly over port edges for their full extent at extreme positions of the valve cover.

The theft prevention baffle shown in Figs. I, II, III, and X is to guard against a common method employed by dishonest consumers to procure gas in excess of meter registration, namely, to disconnect the meter outlet 17a, insert a wire through the opening 81 in the meter casing, and force the wire along the fork channel branch 16 (Fig. III) until the valve cover is met and raised from its seat. The meter is then re-connected, with the wire still holding the cover off its seat, when gas will pass to the meter outlet without registering. To prevent this, I have installed in the central portion of the fork channel 82 two baffle plates 83, 84, extending vertically from the valve table 2 to the bottom of the fork channel, extending horizontally from positions near the meter casing, with small openings 85, 86 intervening, for some distance into the fork channel in the portions marked 87, 88, and thence bending towards the rear and front of the meter respectively to end on the fork channel end wall 89 as shown. The portions furthest from the outlet 17a are apertured as at 90, 91, leaving marginal portions 92, 93, 94 in each baffle adjacent to the boundaries of the fork channel space. The width of the openings 85, 86, should be small enough to prevent the passage of any implement capable of lifting and holding the valve cover off its seat.

Portions 87, 88 are so positioned that a wire passing between them cannot reach in a straight line to any point under the valve cover 10. If the wire strikes the end wall 89 of the fork channel and is deflected to the right or left, it is contemplated that the wire will be caught, and held from the space under the valve cover, by the marginal portions 92, 93, 94. The apertures 90, 91 are adequate in size for the required gas flow, being in fact larger than the outlet of the fork channel branch 16. My improved baffle means causes but a small deflection of gas current from the normal direction of flow from fork channel branch 16 to outlet 17a, that would obtain if the baffle were omitted, in comparison with prior art disclosures which necessitate considerable deflections in flow. Of course, any deflection from the normal direction of flow absorbs pressure, and thereby decreases meter capacity.

Fig. X shows an alternative form of theft prevention baffle means, in which the marginal portions 92 and 94 are omitted, with portions 95, 96 corresponding to 87, 88 of Fig. I, and separate portions 97, 98 corresponding to marginal portions 93.

The fork channel 17 is formed with the bottoms of its branches 16 substantially in the same inclined plane, which plane intersects the valve table 2 in a line at right angles to the longitudinal axis of the meter. As shown most plainly in Fig. III, the bottom outer edges of each branch, 99 and 100, extend from the region of their junction with the valve table 2 to the line where the bottom of the fork channel is fixed to the meter casing, to the points 101, 102. Thus a cross section of the fork channel branch 16 at right angles to its length has a trapezoidal form, as in Fig. XI, providing a greater area for gas flow, for a given clearance between fork channel bottom and bellows 5, than exists if the branch cross section is generally rectangular and of depth approximately equal to the line 103—104, as in the ordinary meter. Clearance from bellows 5 is clearly shown in Fig. II. Ample space is provided for the installation of baffle members.

It will be seen that this fork channel, in the design shown, can be formed from a single plane sheet with comparatively little distortion of the metal except bending on straight lines.

The function of the crank arm 42 over the outward travel of the valve cover is that of a thrust rod. For proper stiffness, therefore, the moments of inertia of the cross section about horizontal and vertical axes should be equal. This condition has been attained by providing crank arms of symmetrical cross section, preferably round or square, which may be of tinned steel wire. To afford proper bearing surfaces, bushings 105 (Fig. II) and 106 (Fig. I), of appropriate composition and hardness, are set into the ends of the crank arms, engaging respectively the valve crank 47 and the valve wrist 51; and the wire is fastened to these bushings by solder or otherwise.

Wear at the crank arm bearings has a marked effect on the accuracy and smoothness of action of the meter, by reason of the direct relation of such wear to the valve motion. In the form of crank arm shown, the area of bearing contact may be increased, and the wear therefore lessened, by increasing the vertical height of the bushings 105, 106, at small expense compared to the same change in bearing contact in those crank arms of the prior art punched from sheet metal, in which the thickness of the central part of the arm is the same as the thickness at the bearings.

Stuffing boxes are provided with a small plate spring 107 (Fig. XII) inserted under the stuffing box cap 108 (Fig. II) and bearing on a small washer 109. On screwing down the cap 108, pressure is exerted on the packing 110 to render the stuffing box gas tight. As the packing wears under continued movement of the flag rod 29, the spring 107 will follow up and force the washer 109 downwards, thereby further compressing the packing and preventing the leakage which would otherwise occur.

Similar plate springs and washers are installed in the crank stuffing box 41, as well as in the flag rod stuffing boxes 31.

While I have herein shown and described my invention in connection with a gas meter of a specific type, certain of the features can obviously be used with other kinds of meters within the scope of the appended claims.

Having thus described my invention, I claim:

1. In a gas meter, a pair of opposingly arranged bellows; valves, consisting of slide covers, and seats for controlling flow of gas into and out of the bellows; mechanism deriving movement from the bellows for actuating the valves, including a valve crank shaft, a tangent arm on the shaft, front and rear flag rods, front and rear flag arms on the rods connected by front and rear links to the tangent arm, and crank arms connecting the valve crank shaft with the valves; so arranged that a line drawn from one extreme position of a flag arm bearing axis to the valve crank shaft axis forms an acute angle with a line drawn from the other extreme position of the same flag arm bearing axis to the valve crank shaft axis, said acute angle being substantially equal to the angles between a crank arm and the corresponding axis of valve cover motion when the valve cover is in admission positions.

2. A gas meter as in claim 1, which the flag arms are of different effective lengths.

3. A gas meter as in claim 1, in which the arcs of motion of the flag arm bearing axes included within said acute angles are respectively concave and convex as viewed from the position of the valve crank shaft.

4. A gas meter as in claim 1, in which the positions assumed by the flag arms during their travel are generally transverse to the meter for one flag arm, and generally lengthwise of the meter for the other flag arm.

5. In a gas meter, a pair of bellows; valves, comprising slide covers and seats for controlling flow of gas into and out of the bellows; mechanism deriving movement from the bellows for actuating the valves, including a valve crank shaft, a tangent arm on the shaft, front and rear flag rods both on the same side of the bellows axis, front and rear flag arms on the rods connected to the tangent arm by front and rear links, and crank arms connecting the valve crank shaft with the valves, such that a line drawn from one extreme position of a flag arm bearing axis to the valve crank shaft axis forms an acute angle with a line drawn from the other extreme position of the same flag arm bearing axis to the valve crank shaft axis, and such that the arcs of motion of the flag arm bearing axes included within said acute angles are respectively concave and convex when viewed from the position of the valve crank shaft: whereby synchronism in the movements of bellows and valves is produced.

6. A gas meter as in claim 5, in which said acute angle is substantially equal to the angles between a crank arm and the corresponding axis of valve cover motion when the valve cover is in admission positions.

7. A gas meter as in claim 5, in which the flag arms are of different effective lengths.

8. A gas meter as in claim 5, in which the positions assumed by the flag arms during their travel are generally transverse to the meter for one flag arm, and generally lengthwise of the meter for the other flag arm.

9. A gas meter as in claim 5, in which the front and rear links are of different lengths.

10. In a gas meter, a pair of bellows; valves, comprising slide covers and seats for controlling flow of gas into and out of the bellows; mechanism deriving movement from the bellows for actuating the valves, including a valve crank shaft, a tangent arm on the shaft, front and rear flag rods, front and rear flag arms on the rods connected to the tangent arm by front and rear links of different lengths, and crank arms connecting the valve crank shaft with the valves, such that a line drawn from one extreme position of a flag arm bearing axis to the valve crank shaft axis forms an acute angle with a line drawn from the other extreme position of the same flag arm bearing axis to the valve crank shaft axis, said acute angle being substantially equal to the angles between a crank arm and the corresponding axis of valve cover motion when the valve cover is in admission positions.

11. A gas meter as in claim 10, in which the arcs of motion of the flag arm bearing axes included within said acute angles are respectively concave and convex when viewed from the position of the valve crank shaft.

12. A gas meter as in claim 10, in which the flag arms are of different effective lengths.

13. A gas meter as in claim 10, in which the positions assumed by the flag arms during their travel are generally transverse to the meter for one flag arm, and generally lengthwise of the meter for the other flag arm.

WILLIAM LAIRD BROWN.